United States Patent [19]

Simelunas

[11] Patent Number: 4,528,900
[45] Date of Patent: Jul. 16, 1985

[54] HIGH PRODUCTION APPARATUS FOR FORMING FILLED EDIBLE PRODUCTS

[75] Inventor: William J. Simelunas, Glen Rock, N.J.

[73] Assignee: Nabisco Brands, Inc., Parsippany, N.J.

[21] Appl. No.: 540,982

[22] Filed: Oct. 11, 1983

[51] Int. Cl.³ .............................................. A21C 9/00
[52] U.S. Cl. .................................. 99/450.7; 99/450.2; 425/133.1
[58] Field of Search ................. 99/450.1, 450.2, 450.3, 99/450.6, 450.7; 426/275, 516, 503, 502, 94, 283; 425/132, 130, 209, 131.1, 307, 133.1; 83/620

[56] References Cited

U.S. PATENT DOCUMENTS 3,277,846 10/1966 Kesselman .......................... 99/450.2
3,494,302 2/1970 Wolf et al. ....................... 426/503 X
4,075,359 2/1978 Thulin ............................. 426/503 X Primary Examiner—Timothy F. Simone
Attorney, Agent, or Firm—Richard Kornutik

[57] ABSTRACT

Dough pieces for a baked product having an inner portion enveloped by a dissimilar outer portion are formed at a high production rate by continuously extruding two dissimilar materials to provide an extrudate rope composed of an inner core and an outer tube of different materials, depositing the extrudate rope on a continuously moving conveyor, cutting a double length section from the end of the rope with a blunt blade at one point along the conveyor, and on the same stroke dividing the double length section into individual dough pieces with a blunt blade.

4 Claims, 4 Drawing Figures

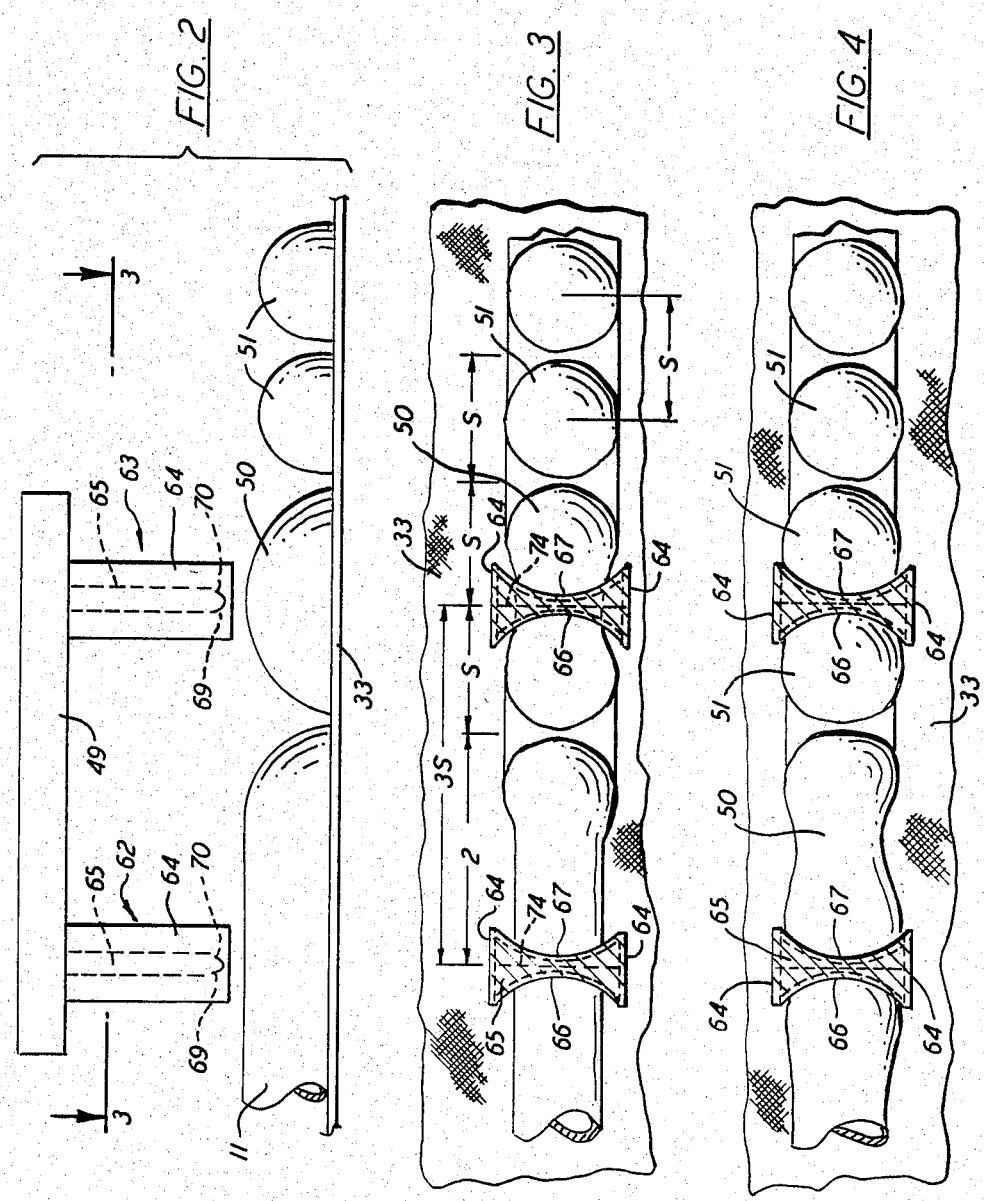

HIGH PRODUCTION APPARATUS FOR FORMING FILLED EDIBLE PRODUCTS

BACKGROUND OF THE INVENTION

The present invention relates to the manufacture of edible products having dissimilar inner and outer portions, and, more particularly to the manufacturer of such products in which the inner portion is enveloped by the outer portion.

The types of products to which the present invention relates includes baked goods that are baked from dough pieces having an outer layer of farnacious dough and a core which may be a dissimilar dough or another material such as a jam, cream, puree, paste, or other extrudable form of fruit, cheese, meat, vegetable, confection or other edible substance. In those products where the core is also a dough, the inner and outer doughs would be dissimilar in composition so as to produce different tastes, colors, appearances, textures, consistencies, or the like in the inner and outer portions of the baked product.

In the past, products of this type have been formed from laminated sheets in which two dough layers are separated by a layer of filling material. This approach is used in the method disclosed in U.S. Pat. No. 3,494,302 wherein the laminated sheet is divided transversely and longitudinally into rectangular dough pieces. The product produced by the method and apparatus of that patent is danish pastry. If such an approach were used to produce products using doughs which spread during the baking process, like soft cookie doughs, the individual rectangular pieces would have to be separated in both the longitudinal and transverse directions to prevent the dough pieces from fusing together during baking. It would, of course, require extra labor or machinery to effect such separations.

The laminated sheet approach is not suitable for producing products having the round configuration associated with most conventional cookies. To achieve a round baked product, the dough piece must be round or substantially round, depending on the extent to which the dough spreads during baking. To cut round dough pieces from a dough sheet produces a high proportion of scrap. In the production of round unfilled cookies and crackers, the scrap is mixed back into the dough so there is no waste. However, this cannot be done when the dough sheet is a laminate of different materials. The scrap from such a laminate contains some of each material, and to mix it into either of the materials in quantity would change the character of that material and blur the distinction between the outer and inner portions of the baked product.

Another approach to forming products having different inner and outer portions, is disclosed in U.S. Pat. No. 3,572,259. In this approach, the two materials are concentrically extruded and the extrudate rope is divided and formed into concentric dough balls by a pair of rotating wheels having spirally configured peripheries. The apparatus shown, while effective for use in small bakeries, has a limited production capacity and requires a relatively large floor area for its capacity.

The typical band oven used in large commercial bakeries carries up to 18 rows of two inch diameter cookies. The machine of the patent under discussion is capable of producing only a single row of dough pieces. Therefore, 18 of these machines would be required to fill a modern high production oven. Also, it would be necessary to provide a system of conveyors to carry the dough pieces from the machines and deposit them in a regular pattern on the band of the oven.

In the co-pending application of Albert A. Pinto, Ser. No. 507,401, filed June 24, 1983 and assigned to the assignee of the present application, an improved method and appartus is disclosed for forming filled baked goods with low waste, and in quantities sufficient to supply a modern band oven. In the method and apparatus disclosed in this copending application, two dissimilar materials are continuously co-extruded to provide a series of parallel extrudate ropes each composed of an inner core and an outer tube of different materials. The extrudate ropes are deposited on a continuously moving horizontal conveyor and are divided into dough pieces by a reciprocating cutter. The cutter employs blunt knives that displace the inner core material away from the zone beneath the knives, seal the outer tube to itself along that zone, and sever the outer tube within that zone. On each stroke of the cutter, one dough piece is formed at the end of the each extrudate rope.

This apparatus produces dough pieces in sufficient quantity to supply a band oven, but it must be run at top speed to do so, and even then it cannot match the production rate of some ovens.

Reciprocating cutter mechanisms are subject to significant impact loading each time the cutter blades strike the backing plate beneath the conveyor belt. These impact loadings produce vibrations in the reciprocating mechanism which limit the speed at which the machine can run efficiently. Also, high speed operation causes the machine to wear rapidly and leads to malfunctions with attendant down time while repairs are being made.

SUMMARY OF THE INVENTION

Accordingly, it is an object of this invention to provide an improved high production method and apparatus for producing filled baked goods.

The foregoing object is accomplished by continuously co-extruding two dissimilar materials to provide an extrudate rope composed of an inner core and an outer tube of different materials, depositing the extrudate rope on a continuously moving conveyor, cutting a multiple length sections from the end of the rope with a blunt blade at one point along the conveyor, and on the same stroke dividing multiple length sections into individual dough pieces with blunt blade means.

BRIEF DESCRIPTION OF THE DRAWINGS

A preferred embodiment of the invention has been chosen for purposes of illustration and description and are shown in the accompanying drawings, forming a part of the specification, wherein:

FIG. 2 is an enlarged view of a portion of FIG. 1 with the rubber web removed, FIG. 3 is a plan view taken along line 3—3 on FIG. 2 showing the condition of the extrudate sections prior to a cutting stroke, and FIG. 4 is a plan view similar to FIG. 3 showing the condition of the extrudate sections after the cutting stroke.

DESCRIPTION OF THE PREFERRED EMBODIMENT

Figure 1:
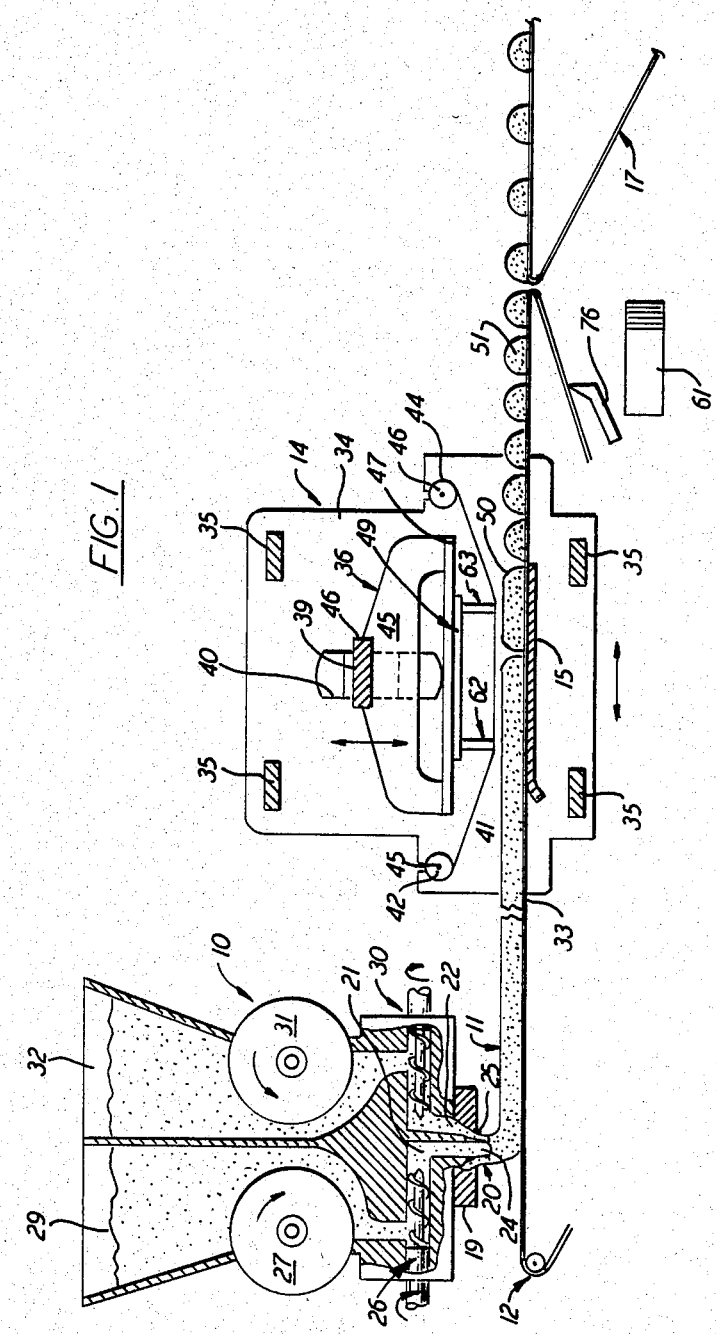
FIG. 1 is a side elevational view partly in section, schematically illustrating apparatus in accordance with the present invention.

Referring to the drawings, and particularly to FIG. 1 thereof, there is shown apparatus according to the present invention which generally includes an extruder 10 producing an extrudate rope 11 of two dissimilar materials arranged concentrically, a conveyor 12 carrying the extrudate rope 11 away from the extruder 10, a reciprocating cutter mechanism 14 positioned above the conveyor, a backing plate 15 positioned beneath the conveyor at the cutting location, and a second conveyor 17 extending toward a baking oven (not shown) and moving faster than the conveyor 12.

The conveyor 12 may be of any width, and normally is equal in width to that of the band of the oven which it feeds. A typical oven band width is 42 inches. In apparatus according to the present invention, a conveyor of that width could accommodate 18 parallel extrudate ropes spaced across the width thereof.

The extruder 10 extends across the entire width of the conveyor and includes a die block 19 which provides a plurality of coextrusion dies 20 (for example, 18 in number) of conventional design which are spaced across the conveyor. Each of the dies 20 have an inner port 21 and an outer port 22. A filler material is fed to the inner port 21 of each die and is extruded as the core portion 24 of the extrudate ropes 11. A dough is fed to the outer port 22 of each die and is extruded as the outer tube portion 25 of the ropes 11.

The inner ports 21 of the dies 20 are fed by individual screw extruders 26. All of the extruders 26 are fed by a single serrated feed roll 27 from a hopper 29. The outer ports 22 of the dies are fed by individual screw extruders 30. All of the extruders 30 are fed by a single serrated feed roll 31 from a hopper 32. The feed rolls 27, 31 and the hoppers 29, 32 extend across the width of the conveyor 12.

The screws of the extruders 26 are each driven to provide the same rate of flow of inner material to their respective dies. In like manner the screw of the extruders 30 are each driven to provide the same rate of flow of outer material to each of the dies. Typically, the set of extruders 26 and the set of extruders 30 would each be driven by separate motors, each motor driving its respective set of extruders through a gear train. The drive motors would typically be provided with speed controls to vary the rate of flow of the inner and outer materials independently.

The conveyor 12 includes a cotton fabric conveyor belt 33 which extends from the extruders and passes beneath the cutter 14.

The cutter 14 includes a pair of vertical plate members 34 interconnected by transverse bars 35. The cutter 14 is mounted on pivoted legs (not shown) and is reciprocated horizontally parallel to the conveyor belt 33. A die head 36 carrying cutter blade units 62 and 63 is mounted between the plates 34 for vertical reciprocating movement. The die head 36 is provided with a slide block 39 that is slideably positioned in a vertical slot 40 formed in each of the plate members 34.

The reciprocating motions of the cutter 14 are such that the die head 36 is moving horizontally at the velocity of the conveyor belt 33 during the time the dies is in engagement with the extrudate ropes 11.

A thin rubber web 41 is positioned between the cutter blades 62, 63 and the extrudate ropes 11. The web extends from a supply roll 42 to a take-up roll 44. The rolls 42 and 44 are respectively wound around rods 45 and 46 that extend between the plates 34. In the preferred embodiment, the web 41 is a latex rubber sheeting of between 6 and 9 thousandths of an inch in thickness.

As the die head 36 moves downwardly, it carries the rubber web toward the dough sheet. When the cutter blade units 62, 63 are pressed into the extrudate ropes 11, the web stretches and conforms to the contours of the blade units. Upon upward movement of the die head, the web contracts to its orginal flat configuration and insures positive separation of the cut dough pieces from the cutter blade units. When the blades begin to cut through the rubber web, the rods 45 and 46 are manually rotated to bring a fresh section of web under the die.

The die head 36 is mounted between the slide blocks 39 by means of a plurality of arc formations 45 joined to a bar 46 which is carried by the blocks 39. A bolster plate 47 is bolted to the arc formations 45 and a cutter die 49 carrying the blade units 62, 63 is bolted to the bottom of the bolster 47.

Referring now to FIGS. 2-4, the cutter blade units 62, 63 shown for purposes of illustration are of a type disclosed in detail in the aforementioned co-pending application. The units 62, 63 include edge blades 64 positioned parallel to the rope 11 on each side thereof, and a central blade member 65 extending across the rope 11 between the blades 64. The blade member 65 is formed with concave surfaces 66 and 67 facing upstream and downstream respectively.

The surfaces 66, 67 are formed with inwardly tapered edges 69, 70 respectively. The bottom or land portion of the member 65 is composed of two flat surfaces which meet along a ridge line 74 and slant upwardly from the ridge line at a very shallow angle.

In each operation, on each stroke the cutter blade unit 62 cuts a double length dough piece 50 from the end of the rope 11. At the same time, the cutter blade unit 63 divides the piece 50 formed on the previous stroke, into two dough pieces 51. Therefore on each stroke two dough pieces 51 are formed, doubling the rate of production of the apparatus of the co-pending application.

This is accomplished by spacing the cutter units 62, 63 at a distance equal to three times the center to center spacing S of the dough pieces 51, and by timing the speed of the cutter 14 and the conveyor belt 33 so that the belt 33 moves twice the spacing S between cutting strokes.

Alternatively, the units 62, 63 could be spaced at five times the spacing S, in which case the blade unit 63 would, on each stroke, divide the double length piece 50 that was formed two cycles earlier.

The type of blade unit disclosed herein produces a thin smear of waste dough 75 which adheres to the belt 33 and is removed by a scraper 76 shown in FIG. 1 positioned above a waste receptacle 61. It will be appreciated by those skilled in the art that other blade arrangements can be readily used in the practice of this invention.

It will be seen from the foregoing that the present invention provides improved high production method and apparatus for producing filled baked goods.

I claim:

1. Apparatus for forming dough pieces having dissimilar inner and outer portions wherein the inner portion is enveloped by the outer portion, said apparatus comprising in combination means for continuously extruding two dissimilar materials to form an extrudate rope in which the dissimilar materials are arranged to provide an inner core surrounded by an outer tube, said outer tube consisting of a dough, continuously driven conveyor means for transporting the extrudate rope in horizontal orientation, means for forming said dough pieces from said extrudate rope including first and second blade members spaced along said extrudate rope, and means for moving said blade members downwardly against the extrudate rope at respective zones thereof, said dough pieces having respective centers and a common dough-piece spacing defined by the center-to-center distance between adjacent dough pieces on said conveyor means, said blade members having blunt edges for deforming said extrudate rope to displace the material of said inner core from the zones under the descending blade members, for sealing the outer tube to itself at said zones and for severing the outer tube along sealed portions thereof at said zones, said first and second blade members being spaced from each other by a distance equal to an odd multiple of the spacing of the dough pieces, said conveyor means being driven to move a distance equal to twice the spacing of the dough pieces between each operation of said blade members, whereby said first blade member cuts off a double length section of extrudate rope and said second blade member divides said double length section into individual dough pieces.

2. Apparatus according to claim 1 wherein said first and second blade members are spaced from each other by a distance equal to three times the spacing of the dough pieces.

3. Apparatus for forming dough pieces having dissimilar inner and outer portions wherein the inner portion is enveloped by the outer portion, said apparatus comprising in combination means for continuously extruding two dissimilar materials to form an extrudate rope in which the dissimilar materials are arranged to provide an inner core surrounded by an outer tube, said outer tube consisting of a dough, continuously driven conveyor means for transporting the extrudate rope in horizontal orientation, means including a blade member for forming said dough pieces from said extrudate rope, and means for moving said blade member downwardly against the extrudate rope at a zone thereof, said blade member having a blunt edge for deforming said extrudate rope to displace the material of said inner core from the zone under the descending blade, for sealing the outer tube to itself at said zone and for severing the outer tube along sealed portion thereof at said zone.

4. Apparatus for forming dough pieces having dissimilar inner and outer portions wherein the inner portion is enveloped by the outer portion, said apparatus comprising in combination means for continuously extruding two dissimilar materials to form an extrudate rope in which the dissimilar materials are arranged to provide an inner core surrounded by an outer tube, said outer tube consisting of a dough, continuously driven conveyor means for transporting the extrudate rope in horizontal orientation, means for forming said dough pieces from said extrudate rope including first and second blade members spaced along said extrudate rope, and means for moving said blade members downwardly against the extrudate rope at respective spaced-apart zones thereof, said dough pieces having respective centers and a common dough-piece spacing defined by the center-to-center distance between adjacent dough pieces on said conveyor means, said means for forming including means for deforming said extrudate rope to displace the material of said inner core from said zones and for sealing the outer tube to itself at said zones, said first and second blade members being spaced from each other by a distance equal to an odd multiple of the spacing of the dough pieces, said conveyor means being driven to move a distance equal to twice the spacing of the dough pieces between each operation of said blade members, whereby said first blade member cuts off a double length section of extrudate rope and said second blade member divides said double length section into individual dough pieces.

* * * * *